July 23, 1968     R. H. HARRISON     3,393,631
APPARATUS FOR MAKING A CARBONATED BEVERAGE
Filed May 26, 1967
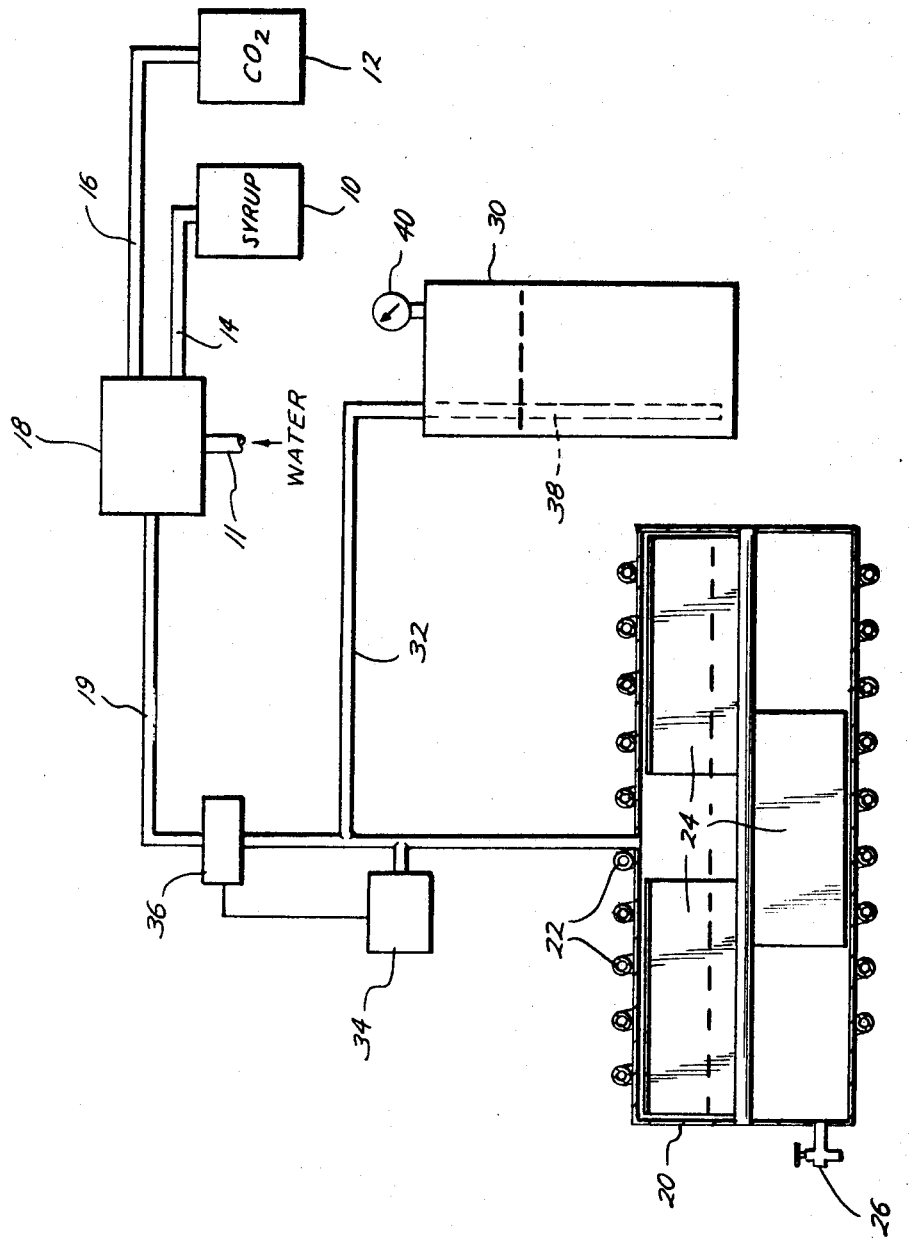
Robert H. Harrison
INVENTOR
BY
ATTORNEYS

United States Patent Office 3,393,631
Patented July 23, 1968

3,393,631
APPARATUS FOR MAKING A CARBONATED BEVERAGE
Robert H. Harrison, Houston, Tex., assignor to Houston Coca-Cola Bottling Co., Houston, Tex., a corporation of Tennessee
Filed May 26, 1967, Ser. No. 641,696
5 Claims. (Cl. 99—275)

ABSTRACT OF THE DISCLOSURE

An apparatus for making a partially frozen carbonated beverage having a pressurized supply of carbonated liquid connected to a refrigerated container in which a closed ballast tank is provided in communication with the container through a conduit opening into the tank at a point adjacent the bottom of the tank whereby fluid can flow in both directions between the tank and the container in response to pressure conditions in the tank and container and a relief valve in the tank which opens on a predetermined pressure to release gas from the tank for insuring that the ballast tank will receive liquid.

Background of the invention

The present invention relates to an improvement in an apparatus for making a partially frozen carbonated beverage in which a pressurized supply of carbonated liquid is refrigerated in a container to provide a frozen and fluffy beverage in which a closed ballast or pressure tank is provided in communication with the refrigerated container in which fluid can flow back and forth between the container and the tank in response to pressure conditions.

In general, the production of a slushy or fluffy carbonated beverage by freezing a pressurized mixture of carbonated liquid is generally shown in Patent Nos. 3,044,878, 2,134,787 and 1,548,430. However, in these prior art devices the operating conditions are not suitably controlled which cause difficulties with the operation of the apparatus and which adversely affect the quality of the product. For instance, the pressure and volume of the product in the refrigerated container varies as the beverage is frozen and when a portion of the beverage is dispensed from the container. The present invention overcomes these problems by allowing the carbonated mixture to flow into and out of the freezing container in response to the operating conditions.

Summary

The present invention is directed to improvements in an apparatus for making a partially frozen carbonated beverage in which a ballast or pressure tank is provided in communication with the refrigerated container which receives a pressurized supply of carbonated liquid whereby the fluid can flow in both directions between the tank and the container in response to operating conditions existing in the tank and container.

The present invention is also directed to providing an improvement in an apparatus for making a partially frozen slushy type carbonated beverage in which a pressurized supply of carbonated liquid is connected to a refrigerated container in which a pressure switch is positioned between the liquid supply and the refrigerated container and opens on a predetermined low pressure to allow the liquid supply to flow into the container and closes on a predetermined high pressure in the container to stop the flow of fluid to the container, and in which a closed ballast tank is connected to the container downstream of the pressure switch through a conduit opening into the tank at a point adjacent the bottom of the tank whereby fluid may flow between the tank and the container in response to operating conditions.

A still further object of the present invention is the provision of a refrigerated carbonated beverage apparatus in which a closed ballast tank is provided in communication with a refrigerated container for flowing fluid in both directions between the tank and the container in response to operating conditions, and in which the tank includes a relief valve adjacent the top which opens on a predetermined pressure to release gas from the tank thereby providing space in the tank for liquid.

Brief description of the drawing

The drawing is a schematic illustrating the present invention.

Description of the preferred embodiment

Referring now to the drawing, the beverage may be of any suitable composition and one form generally includes a suitable flavoring syrup, water, and carbonating gas such as carbon dioxide. For example only, the syrup may be in a container 10, provided through a line 14, and the $CO_2$ provided in a container 12. The components of the beverage are suitably premixed in the proper proportion. Thus the syrup is delivered through line 14 under pressure or by pump, the carbon dioxide is delivered from its container 12 through line 16, by way of example only, 60 p.s.i.g., and the water suitably delivered through line 11 to a conventional mixer 18, such as a McCann converter where the water, syrup and carbon dioxide are conventionally premixed under pressure. Normally the pressurized carbonated beverage is transmitted through a line 19 to a conventional refrigerated or freezing container 20 which is refrigerated such as by coils 22 connected to a suitable refrigeration system (not shown) in which the temperature of the liquid therein will be reduced to slightly below the freezing point where it is frozen to a slushy semi-solid state and further mixed by a rotating blade 24 which also has the function of scraping ice deposits from the walls of the container 20. The beverage is dispensed through a valve 26 to a suitable container such as a drinking cup or glass (not shown).

However, the volume of liquid in the refrigerated container 20 varies as the temperature and pressure therein varies and with the admission and the dispensing of the beverage from the container 20. This variation in pressures can result in the overfill and over pressurizing of the container 20 and also has adverse results in both the quality of the beverage and the operation of the apparatus.

In one form of the apparatus a pressure sensing control 34 may be connected to the line 19 for measuring and controlling the pressure in the container 20. A pressure actuated solenoid valve 36 is connected to and actuated by the pressure sensing control 34. The pressure sensitive control 34 senses the pressure in the container 20 and upon a predetermined low pressure opens the electric solenoid valve 36 to admit the pressurized carbonated mixture from the mixer 18 until the container 20 is filled to the desired level and causing the pressure therein to rise to a predetermined level at which time the control 34 actuates and closes the solenoid valve 36 stopping the flow of mixture through the line 19 to the container 20. Generally, and by way of example only, in one type of operation the container 20 will be filled approximately half full with the incoming carbonated liquid with an operating pressure range of approximately 23 to 28 p.s.i.g. That is, the control 34 opens the solenoid 36 when the pressure in the container 20 drops below 23 p.s.i.g. and closes the solenoid valve 36 and the line 19 when the pressure in the container 20 reaches approximately 28 p.s.i.g. Of course, the pressure sensing and control can be effected at or before the premix 18, but in any event a suitable pressurized supply of carbonated liquid is supplied to the refrigerated container 20.

The present invention is directed to providing a ballast or pressure tank 30 which is connected through line 32 to the refrigerated or freezing container 20. The purpose of the ballast tank 30 is to provide communication in both directions between the container 20 and the tank 30 so that the fluid therein may flow between the container 20 and the tank 30 in response to operating conditions therein. Thus, fluid can flow from the refrigerating container 20 through line 32 and into the ballast tank 30. When putting the equipment into operation the ballast tank is closed, and thus contains air under atmospheric pressure. As the incoming pressurized carbonated liquid flows from the mixer 18 through the line 19, the liquid will flow through line 32 into the ballast tank 30 as well as into the refrigerated container 20 equalizing the pressure in the system. As the carbonated beverage in the refrigerated container 20 begins to freeze and expand and the pressure in container 20 builds up, fluid from the container 20 will flow through the line 32 and into the ballast tank 30 thereby preventing undesirable pressures in the container 20. The conduit 32 leading into the ballast tank 30 includes a dip stick 38 which terminates adjacent the bottom of the ballast tank 30 so that as the pressure decreases in the refrigeration container 20, such as due to dispensing drinks therefrom, the fluid in the ballast tank will flow back through the tube 38 and line 32 into the container 20 to maintain a pressure balance therebetween until the pressure sensitive switch 34 senses a predetermined low pressure in the system and again opens the solenoid valve 36 to admit an additional supply of liquid.

After some periods of extended use, it has been found that gas pressure will accumulate for various reasons in the ballast tank 30, which if allowed to continue, will fill up the tank 30 with gas and prevent the flow of liquid thereto. Thus, a pop-off valve 40 may be provided which may be set for example at 30 p.s.i.g. so as to be actuated and release gas from the tank 30 in that event.

In operation, the water through line 11 and the syrup from container 10 and the carbon dioxide from the container 12 is transmitted through lines 14 and 16, respectively, to the mixer 18 where the ingredients are mixed in the proper proportion under pressure to provide a carbonated liquid beverage. The mixed liquid then flows from the mixer 18 through the line 19. When the system is first placed in operation the ballast tank 30 is sealed thus having atmospheric air therein. The pressure sensing control 34 will open the soelnoid actuated valve 36 as the pressure in the refrigerating container 20 will be below the predetermined minimum, and the supply of pressurized carbonated liquid will flow into the container 20 and into the ballast tank 30 through line 32. The ballast tank 30 and the container 20 receive the liquid, preferably until the container 20 is suitably filled with liquid at which time the increased pressure therein, such as sensed by the control 34 closes the solenoid valve 36 cutting off the supply of fluid from the mixer 18. The beverage in the container 20 will be refrigerated under pressure, and partially frozen into a slushy homogenous mixture and mixed by the rotating blades 24 and may be drawn off through the valve 26 and dispensed as desired. As the volume of the beverage in the refrigerated chamber 20 varies with the temperature and pressure, the beverage may flow to and from the ballast tank 30 in response to operating conditions. As more liquid is required, the pressure control 34 will actuate the valve 36 to provide the necessary supply.

The present invention, is well adapted to carry out the objects and attain the ends and advantages mentioned as well as others inherent therein. While a presently preferred embodiment is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In an apparatus for making a slushy partially frozen carbonated beverage having a supply of pressurized carbon dioxide, a supply of liquid flavoring and water, a mixer for combining and mixing the carbon dioxide and the flavoring and water, the outlet of the mixer connected to a refrigerated container which includes an outlet valve, and pressure means opening on a predetermined low pressure in the container to allow fluid to flow into the container and closing on a predetermined high pressure in the container to stop the flow of fluid into the container, the improvement comprising, a ballast tank connected to the container downstream of the pressure means through a conduit opening into the tank at a point adjacent the bottom of the tank.

2. In an apparatus for making a refrigerated carbonated beverage having a pressurized supply of carbonated liquid connected to a refrigerated container, the improvement comprising, a closed ballast tank in communication with the container through a conduit opening into the tank at a point adjacent the bottom of the tank whereby fluid can flow in both directions between the tank and the container in response to pressure conditions in the container and the tank.

3. The apparatus of claim 2 in which the tank includes a relief valve which opens on a predetermined pressure to release gas from the tank.

4. In an apparatus for making a partially frozen carbonated beverage having a pressurized supply of carbonated liquid connected to a refrigerated container and a pressure switch positioned between the liquid supply and the container, said switch opening on a predetermined pressure in the container to allow the supply of liquid to flow into the container, and closing on a predetermined pressure to stop the flow of supply liquid to the container, the improvement comprising, a closed ballast tank in communication with the container at a point between the pressure switch and the container whereby fluid can flow between the tank and the container in response to pressure.

5. The apparatus of claim 4 in which the tank includes a gas and the communication to the container includes a conduit opening into the tank a point adjacent the bottom of the tank.

References Cited

UNITED STATES PATENTS

| | | | |
|---|---|---|---|
| 651,412 | 6/1900 | Bieder | 62—70 |
| 1,548,430 | 8/1925 | Ashley | 99—136 |
| 2,132,364 | 10/1938 | Thompson | 62—69 |
| 2,134,787 | 11/1938 | Hartman | 62—70 |
| 3,044,878 | 7/1962 | Knedlik | 99—28 |

ROBERT W. JENKINS, *Primary Examiner.*